Dec. 20, 1955  G. A. ZIEP  2,727,763
PIPE CONNECTOR FOR THREADLESS PIPE
Filed May 29, 1950

Inventor
Gustav Adolf Ziep
by Robert L. Kahn
Attorney

United States Patent Office 2,727,763
Patented Dec. 20, 1955

2,727,763
PIPE CONNECTOR FOR THREADLESS PIPE

Gustav Adolf Ziep, Leipzig, Germany, assignor to Michel Bergman, Chicago, Ill.

Application May 29, 1950, Serial No. 164,879

3 Claims. (Cl. 285—196)

This invention relates to a pipe connector for threadless pipe to obtain tight connections between individual pipes and conduits.

Pipe connectors are old and have generally included sleeves or sockets having internal threaded parts into which the threaded ends of a pipe could be disposed, the joint being made tight by the use of suitable packing material.

Any pipe connector which required that the end of a pipe be threaded is objectionable since the threading of pipe takes considerable time and in many instances the threads can be cut only at the place where the pipe is installed.

In accordance with this invention, the above disadvantages are eliminated. This invention makes it possible to provide a safe and tight connection between opposed pipe ends and makes it possible that this connection be obtained within a minimum time without the cutting of threads on the pipe and consequently at less cost. Generally, this invention provides a sleeve connecting the two pipe ends, said sleeve having opposed conical bodies disposed therein at both ends of the pipe. The conical bodies increase in thickness in the direction away from the end of the pipe. The conical bodies are urged to each other by means of cap nuts threaded on the outside of the sleeve at the two ends thereof.

In the center of the sleeve there is provided an annular shoulder or web which has an internal diameter equal to the internal diameters of the pipes to be coupled. This annular shoulder or web also serves as an end support for packing material disposed annularly around the pipe between the narrow end of the cone and the shoulder or web. The coupling pressure upon the pipe ends is increased by the fact that the inner edge of each conical body remote from the corresponding pipe end tends to bite into the pipe surfaces as the conical bodies are urged toward each other. The resulting connection between pipes is tight and solid and will hold even under repeated blows.

As the two conical bodies are urged toward each other, their respective diameters tend to grow smaller and in order to permit this action to occur, the conical bodies are cut longitudinally in a manner similar to a lockwasher. In order to increase the flexibility of the conical bodies in a direction to reduce their respective diameters and in order to promote the tendency of the conical bodies to grip the pipes, additional notches or cut-outs in the conical bodies are provided to increase the flexibility thereof.

Figure 1:
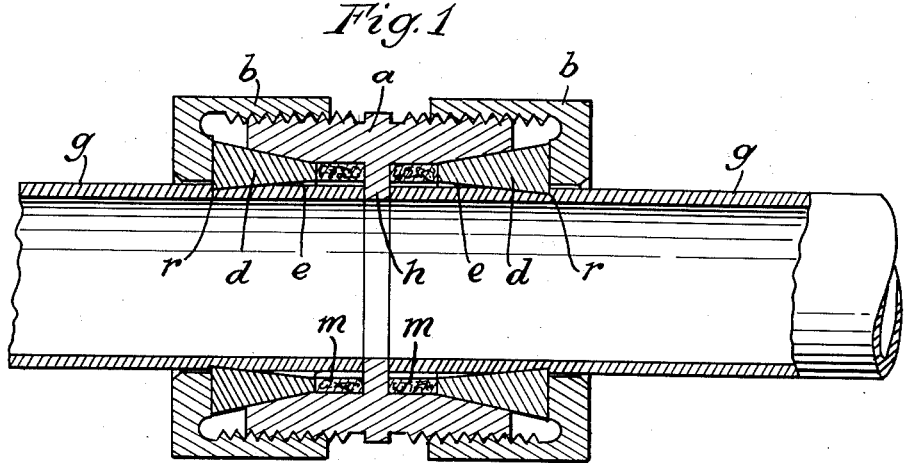
Figure 2:
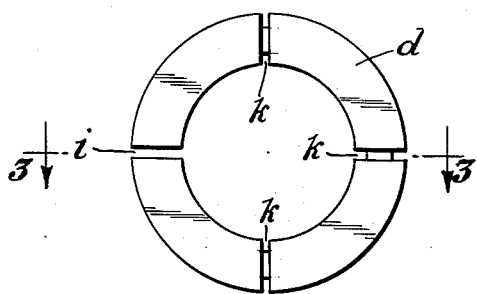
Figure 3:
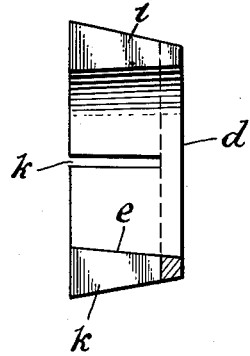

In order that the invention may be understood, it will now be explained in connection with the drawings wherein Figure 1 shows a longitudinal section of two pipe ends connected by a device embodying the present invention. Figure 2 shows a front elevation of one of the conical members and Figure 3 shows a longitudinal section of the conical member.

The pipes to be connected have end portions $g$. These portions are surrounded by sleeve $a$. Sleeve $a$ has the outer surface threaded and is divided into two portions by a centrally disposed internal annular web $h$. It will be noted that the interior of sleeve $a$ has the end portions shaped to define the surface of a cone, the cone enlarging or becoming greater in diameter toward each end of the sleeve. Cooperating with each conical surface of sleeve $a$ is annular conical member $d$. The outside surface of conical member $d$ tends to decrease in diameter toward the center of sleeve $a$ whereas the inside surface of this conical body increases in diameter toward the center of the sleeve. Inner edge $r$ at the thick or base end of the conical body is small enough in diameter so that it tends to hug closely the outside of pipe $g$. Each conical body $d$ has radial slot $i$ extending completely through the wall of the body and is also provided with additional internal notches $k$ at spaced regions in the body. As is readily apparent from Figure 3, notches $k$ do not extend the full length of the conical body. Internal conical surface $e$ extends toward the internal annular web $h$ and between the small end of the conical body and this internal web is disposed suitable packing material $m$.

The two conical bodies $d$ are urged toward each other by cap nuts $b$ engaging the outer threaded parts of sleeve $a$ and having internal shoulders engaging the outer broad base of the conical bodies.

What is claimed is:

1. A pipe connector comprising a sleeve unit with two conical internal surfaces both expanding from the center of the unit toward the ends of the unit, aligned with one another and adapted to surround two aligned pipe ends which have uniform cylindrical outer contour over their entire length; a pair of resilient rings, longitudinally split along their entire length, the outside of each ring forming an external surface matching said internal surfaces and the inside of each ring having conical taper opposite to the taper of the corresponding external surface, so that each ring has a thin end and a thick end, each ring being adapted to be loosely inserted in the sleeve and when so inserted to have its external surface contacting one of the internal surfaces and to have only the inner edge of its thick end contacting one of the pipe ends; and means for applying axial pressure to the thick ends of the rings for moving the rings axially toward one another into the sleeve unit and for thereby contracting the rings so that each ring contacts the pipe end substantially over the entire length of the ring and that the thick end forms a circumferential groove in the pipe end.

2. A pipe connector as described in claim 1 wherein the sleeve unit comprises, between the pressure surfaces, an element of smaller internal diameter than said pressure surfaces.

3. A pipe connector as described in claim 1 wherein the means for applying axial pressure comprises a pair of nut members adapted to engage outside portions of the sleeve unit.

References Cited in the file of this patent

UNITED STATES PATENTS

| | | |
|---|---|---|
| 695,071 | Mooney | Mar. 11, 1902 |
| 2,396,163 | Dies | Mar. 5, 1946 |
| 2,453,024 | Lomelino | Nov. 2, 1948 |
| 2,554,585 | Miller | May 29, 1951 |

FOREIGN PATENTS

| | | |
|---|---|---|
| 97,370 | Great Britain | June 10, 1898 |
| 579,145 | Great Britain | July 24, 1946 |